(12) United States Patent
Pearce et al.

(10) Patent No.: US 9,676,274 B2
(45) Date of Patent: Jun. 13, 2017

(54) FUEL TANK ASSEMBLY

(71) Applicant: THERMO KING CORPORATION, Minneapolis, MN (US)

(72) Inventors: Scott Phillip Pearce, Forest Lake, MN (US); Sunil Kumar P, Ramanagara District (IN); Mary Elizabeth Kime, Cornelius, NC (US)

(73) Assignee: THERMO KING CORPORATION, Minneapolis, MN (US)

( * ) Notice: Subject to any disclaimer, the term of this patent is extended or adjusted under 35 U.S.C. 154(b) by 192 days.

(21) Appl. No.: 14/607,409

(22) Filed: Jan. 28, 2015

(65) Prior Publication Data

US 2016/0214478 A1 Jul. 28, 2016

(51) Int. Cl.
| B65D 90/52 | (2006.01) |
| B60K 15/03 | (2006.01) |
| B29C 51/26 | (2006.01) |
| B65D 88/06 | (2006.01) |

(52) U.S. Cl.
CPC ...... *B60K 15/03177* (2013.01); *B29C 51/267* (2013.01); *B60K 2015/03032* (2013.01); *B60K 2015/0344* (2013.01); *B60Y 2200/148* (2013.01)

(58) Field of Classification Search
CPC .............. B60K 15/077; B60K 15/0777; B60K 15/03177; B60K 2015/03032; B60K 2015/0344; B65D 90/52
USPC .......................... 220/563, 562, 608, 661, 669
See application file for complete search history.

(56) References Cited

U.S. PATENT DOCUMENTS

| 3,330,439 A | 7/1967 | Moorman |
| 3,552,599 A | 1/1971 | Redding |
| 3,595,422 A | 7/1971 | Van Durrett et al. |
| 3,692,453 A * | 9/1972 | Quigg ................. B29C 49/4817 425/308 |
| 4,453,564 A | 6/1984 | Bergesio |
| 4,518,091 A | 5/1985 | Scheurenbrand et al. |
| 4,526,286 A | 7/1985 | Jung et al. |
| 5,012,944 A * | 5/1991 | Scheurenbrand ... B29C 49/4817 220/677 |
| 5,076,703 A | 12/1991 | Loefke et al. |
| 5,344,038 A | 9/1994 | Freeman et al. |
| 6,637,457 B2 | 10/2003 | Evanovich et al. |
| 6,843,384 B2 | 1/2005 | Schmidt et al. |
| 7,455,190 B2 | 11/2008 | Potter et al. |
| 7,819,272 B2 | 10/2010 | Sugiura |
| 8,720,732 B2 | 5/2014 | Criel et al. |
| 8,951,461 B2 * | 2/2015 | Heim ................... B29D 22/003 264/516 |
| 2005/0173433 A1 * | 8/2005 | Spahr ........................ B32B 7/08 220/62.22 |

(Continued)

*Primary Examiner* — J. Gregory Pickett
*Assistant Examiner* — Niki M Eloshway
(74) *Attorney, Agent, or Firm* — Hamre, Schumann, Mueller & Larson, P.C.

(57) ABSTRACT

A fuel tank for a transport refrigeration system is provided. The fuel tank includes an elongate tank body. The elongated tank body has a first end wall; a second end wall; a sidewall extending between the first and second end walls; and an interior space defined by the sidewall and the first and second end walls. The fuel tank further includes a fuel tank vent configured to vent air outside of the fuel tank; a fuel outlet fitting; a fuel discharge tube fitting; and a fuel pickup tube fitting. The entire tank body can be made of a plastic.

17 Claims, 7 Drawing Sheets

(56) References Cited

U.S. PATENT DOCUMENTS

| | | | | |
|---|---|---|---|---|
| 2005/0269333 A1* | 12/2005 | Burrington | ...... | B60K 15/03177 |
| | | | | 220/562 |
| 2007/0251947 A1* | 11/2007 | Plengorth | .............. | B65D 88/06 |
| | | | | 220/562 |
| 2007/0254172 A1* | 11/2007 | Kanazawa | .......... | B29C 63/0082 |
| | | | | 428/461 |
| 2012/0223084 A1* | 9/2012 | Criel | ................ | B60K 15/03177 |
| | | | | 220/564 |
| 2012/0248121 A1* | 10/2012 | Rihtar | ................... | F16B 5/0657 |
| | | | | 220/562 |
| 2012/0313348 A1* | 12/2012 | Pfaff | .................... | B62D 35/001 |
| | | | | 280/423.1 |
| 2013/0193150 A1* | 8/2013 | Keefer | ................... | B64D 37/02 |
| | | | | 220/562 |
| 2013/0284747 A1* | 10/2013 | Rund | ................... | B60K 15/067 |
| | | | | 220/562 |
| 2013/0292387 A1* | 11/2013 | Spencer | ................ | B60P 3/2245 |
| | | | | 220/562 |

* cited by examiner

FUEL TANK ASSEMBLY

FIELD

The embodiments of this disclosure relate in general to fuel tanks, and more specifically to fuel tank assemblies for refrigerated transport units.

BACKGROUND

Refrigerated transport units are used to transport goods over both land and water. These units allow perishable goods contained therein to be transported. A refrigerated transport unit can include an electric motor for driving a refrigerant compressor forming a part of the unit. As a result, refrigerated transport units require a source of electrical power for operation. When located at a freight terminal, a refrigerated container is provided with electrical power through a connection to a conventional source of electrical power. When located on a ship, a refrigerated container receives electrical power from the ship's electrical system. When being transported by road, rail or when no other power source is available, a temporary power source which includes a motor generator set, may be mounted directly to the refrigerated container. The temporary power source includes a fuel tank for the motor, which is typically a diesel engine. Many generator sets are required to have the capability to provide uninterrupted service for an extended length of time. Accordingly, it is desirable to provide a high capacity integral fuel tank for such a generator set.

SUMMARY

The embodiments of this disclosure relate in general to fuel tanks, and more specifically to fuel tank assemblies for refrigerated transport units.

In some embodiments, a fuel tank as described herein can be configured to be made of a plastic material. In such circumstances, the fuel tank described herein can weigh up to 10% lighter than an aluminum tank, thereby allowing easier installation of the fuel tank. Also, the cost for manufacturing a fuel tank composed of plastic rather than aluminum can be reduced effectively. Moreover, the plastic fuel tank described herein can be less susceptive to corrosion and deterioration, potentially more compatible with bio-diesel fuel compared with an aluminum fuel tank. Further, the plastic fuel tank described herein can absorb impact better and can recover from denting better than an aluminum fuel tank.

Also, the fuel tank described herein may include a reinforcing region configured to enhance the strength of the fuel tank. The reinforcing region can be formed on an end wall of the fuel tank and extend through a center of the end wall, thereby enhancing the strength, e.g., impact strength, and the stiffness of the end wall.

Further, the fuel tank described herein may include at least one baffle that restricts the tendency for fuel to slosh within the fuel tank. For example, the fuel tank can include a baffle formed on an inner surface of a tank sidewall and protruding into an interior space enclosed by the sidewall and the end walls of the fuel tank to reduce sloshing, where the location of the baffle corresponds to a baffle recess formed on an outer surface of the sidewall.

Particular embodiments include a fuel tank that has an elongate tank body. The elongated tank body has a first end wall; a second end wall; and a sidewall extending between the first and second end walls; and an interior space defined by the sidewall and the first and second end walls. The fuel tank further includes a fuel tank vent configured to vent air outside of the fuel tank; a fuel outlet fitting; a fuel discharge tube fitting; and a fuel pickup tube fitting. The entire tank body can be made of a plastic.

In some embodiments, a fuel tank assembly includes a fuel tank and a mounting assembly. The fuel tank includes an elongate tank body. The elongated tank body has a first end wall; a second end wall; a sidewall extending between the first and second end walls; and an interior space defined by the sidewall and the first and second end walls. The fuel tank further includes a fuel tank vent configured to vent air outside of the fuel tank; a fuel outlet fitting; a fuel discharge tube fitting; and a fuel pickup tube fitting. The entire tank body can be made of a plastic.

Other embodiments may include a method of making a fuel tank. The method includes fabricating a fuel tank by a molding process. The fuel tank includes an elongate tank body. The elongated tank body has a first end wall; a second end wall; a sidewall extending between the first and second end walls; and an interior space defined by the sidewall and the first and second end walls. The fuel tank further includes a fuel tank vent configured to vent air outside of the fuel tank; a fuel outlet fitting; a fuel discharge tube fitting; and a fuel pickup tube fitting. The entire tank body can be made of a plastic.

These and other embodiments described herein may provide one or more of the following benefits. In instances where the fuel tank assembly herein is composed of plastic, the fuel tank can weigh up to 10% lighter than an aluminum tank, thereby allowing easier installation of the fuel tank. Also, the cost for manufacturing the fuel tank composed of plastic rather than aluminum can be reduced effectively. Moreover, the plastic fuel tank can be less susceptive to corrosion and deterioration, potentially more compatible with bio-diesel fuel compared with an aluminum fuel tank. Further, the plastic fuel tank can absorb impact better and can recover from denting better than an aluminum fuel tank.

Also, the fuel tank may include a reinforcing region configured to enhance the strength of the fuel tank. The reinforcing region can be formed on an end wall of the fuel tank and extend through a center of the end wall, thereby enhancing the strength, e.g., impact strength and the stiffness of the end wall.

Third, the fuel container may include at least one baffle that restricts the tendency for fuel to slosh within the fuel tank. For example, the fuel tank can include a baffle formed on an inner surface of a tank sidewall and protruding into an interior space enclosed by the sidewall and the end walls of the fuel tank to reduce sloshing, where the location of the baffle corresponds to a baffle recess formed on an outer surface of the sidewall.

The details of one or more embodiments of the disclosure are set forth in the accompanying drawings and the description below. Other features, objects, and advantages of the embodiments will be apparent from the description and drawings, and from the claims.

DESCRIPTION OF THE DRAWINGS

Like reference symbols in the various drawings indicate like elements.

DETAILED DESCRIPTION

The terms "above," "on," "under," "top," "bottom," "up," "down," "upper," "lower," "horizontal," "vertical," "front," "rear," "left," "right" and the like used herein are in reference to the relative positions of the fuel tank assembly and its constituent parts, as oriented in the specific figures being described. These terms are not meant to be limiting in any way.

Figure 1:
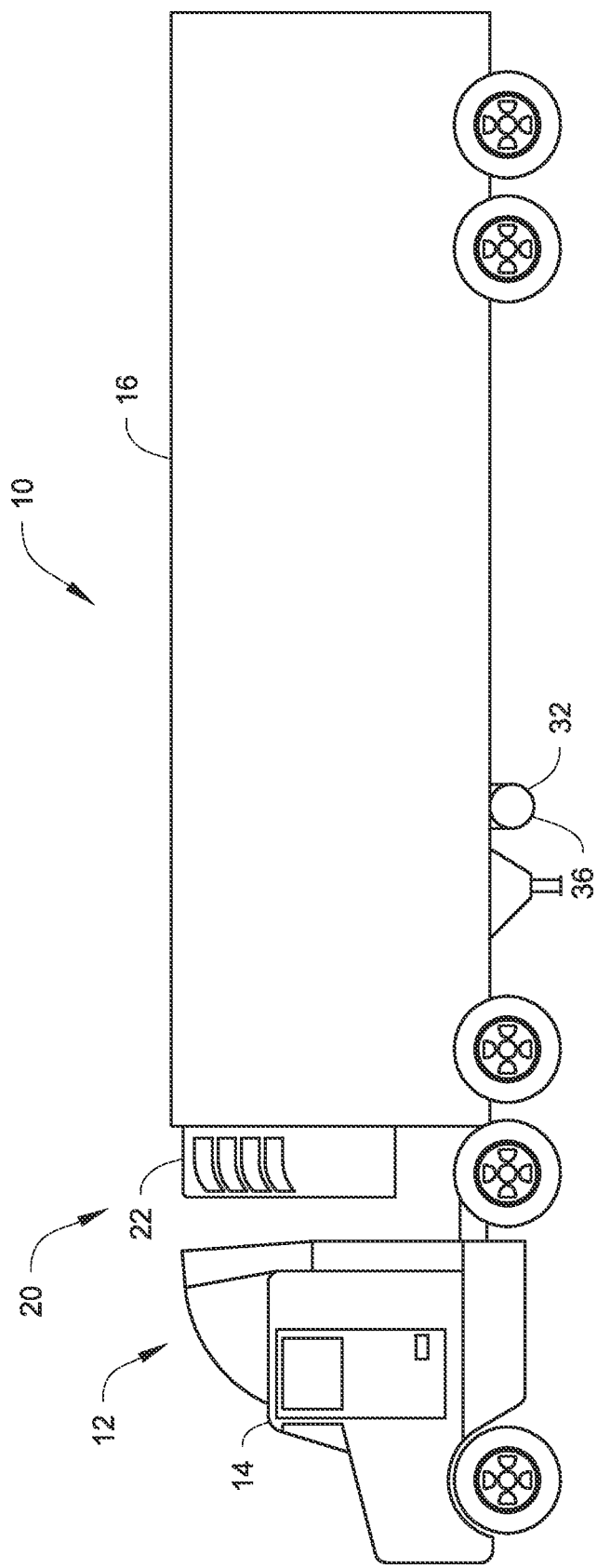
FIG. 1 is a schematic view of a truck that transports a refrigerated transportation unit which includes a first embodiment of a fuel tank.

FIG. 1 is a schematic view of a transport refrigeration system (TRS) 10 including a tractor 12 provided with a driving cab 14 which is removably attached to a refrigerated transport unit 16 and a container chassis 18 for supporting the refrigerated transport unit 16. The TRS 10 includes a transport refrigeration unit (TRU) 20. The TRU 20 has an external unit 22, which is set outside of the refrigerated transport unit 16, and at least one internal heat-exchange unit located inside the TRU 20. The external unit 22 is set on a sidewall of refrigerated transport unit 16. The external unit 22 is hydraulically and electrically connected to an internal unit (not shown) such as a heat-exchange unit by means of respective connection pipes and cables.

Still referring to FIG. 1, the TRS 10 has a fuel tank 32 for providing fuel to the TRU 20. The fuel tank 32 is mounted on the container chassis 18 below the refrigerated transport unit 16. The fuel tank 32 is configured for containing fuels including, by way of example without limitation, diesel fuel, biofuels, gasoline fuel, or the like. The fuel tank 32 is mounted below the refrigerated transport unit 16 with its longitudinal axis oriented transversely relative to the longitudinal axis of the TRS 10 along the length of the TRS 10.

In some embodiments, the fuel tank 32 may be made of suitable material such as a plastic material. In such circumstances, the fuel tank 32 can weigh up to 10% lighter than an aluminum tank, thereby allowing easier installation of the fuel tank 32. Also, use of plastic material allows the cost for manufacturing the fuel tank 32 to be reduced effectively. Moreover, a plastic fuel tank can be less susceptive to corrosion and potentially more compatible with bio-diesel fuel compared with an aluminum fuel tank. Further, the fuel tank 32 can absorb impact better and can recover from denting better than an aluminum fuel tank. In some embodiments, when the fuel tank 32 is used to contain a bio-diesel fuel, the plastic material has a property that can help avoid buildup of sludge from the bio-diesel fuel on the inner wall of the tank 32, compared to an aluminum fuel tank.

In one embodiment, the fuel tank 32 may be made of polyethylene, such as high density polyethylene (HDPE) or low density polyethylene (LDPE). In one embodiment, the entire fuel tank body 36 as shown in FIG. 1 can be made of a synthetic material such as a HDPE material.

The size of the fuel tank 32 can vary as desired. In some embodiments, the fuel tank 32 can be, for example, a ~50-gallon fuel tank.

FIGS. 2-5 illustrate an embodiment of the fuel tank 32 shown in FIG. 1. The fuel tank 32 has a generally cylindrical tank body 136. The tank body 136 includes a middle section 138 having a generally constant diameter along an axial direction (the length) of the fuel tank 32, a first end portion 140 extending axially from one end 139 of the middle portion 138, and a second end portion 142 extending axially from another end 141 of the middle portion 138 opposite to the first end portion 140. First and second end walls 144 and 146 are formed at axial ends of the first and second end portions 140, 142, respectively.

In some embodiment, the diameter of each of the first and second end walls 144, 146 is smaller than the diameter of the tank body 136. In such circumstances, the first and second end portions 140, 142 are tapered when extending toward the first and second end walls. Specifically, the diameter of the tank body 136 is reduced at the first end portion 140 from the end 139 of the middle portion 138 toward the first end wall 144 to allow a smooth transition in diameter from the middle portion 138 to the first end wall 144. Likewise, the diameter of the tank body 136 is reduced at the second end portion 142 from the end 141 toward the second end wall 146 to allow a smooth transition in diameter from the middle portion 138 to the second end wall 146. In some embodiments, each of the first and second end portions can be in a dome shape. In such a case, the diameter of each of the end walls 146, 148 is zero.

The tank body 136 includes a curved sidewall 148, an interior space 149 (referring to FIG. 4) defined by the curved sidewall 148 and the first and second end walls 144, 146, and a longitudinal axis a-a'. The sidewall 148 includes a top portion 152 (which will be defined in more detail below) which is the uppermost portion of the sidewall 148 when the fuel tank 32 is properly mounted to the container chassis 18 of the refrigerated transport unit 16.

Figure 2:
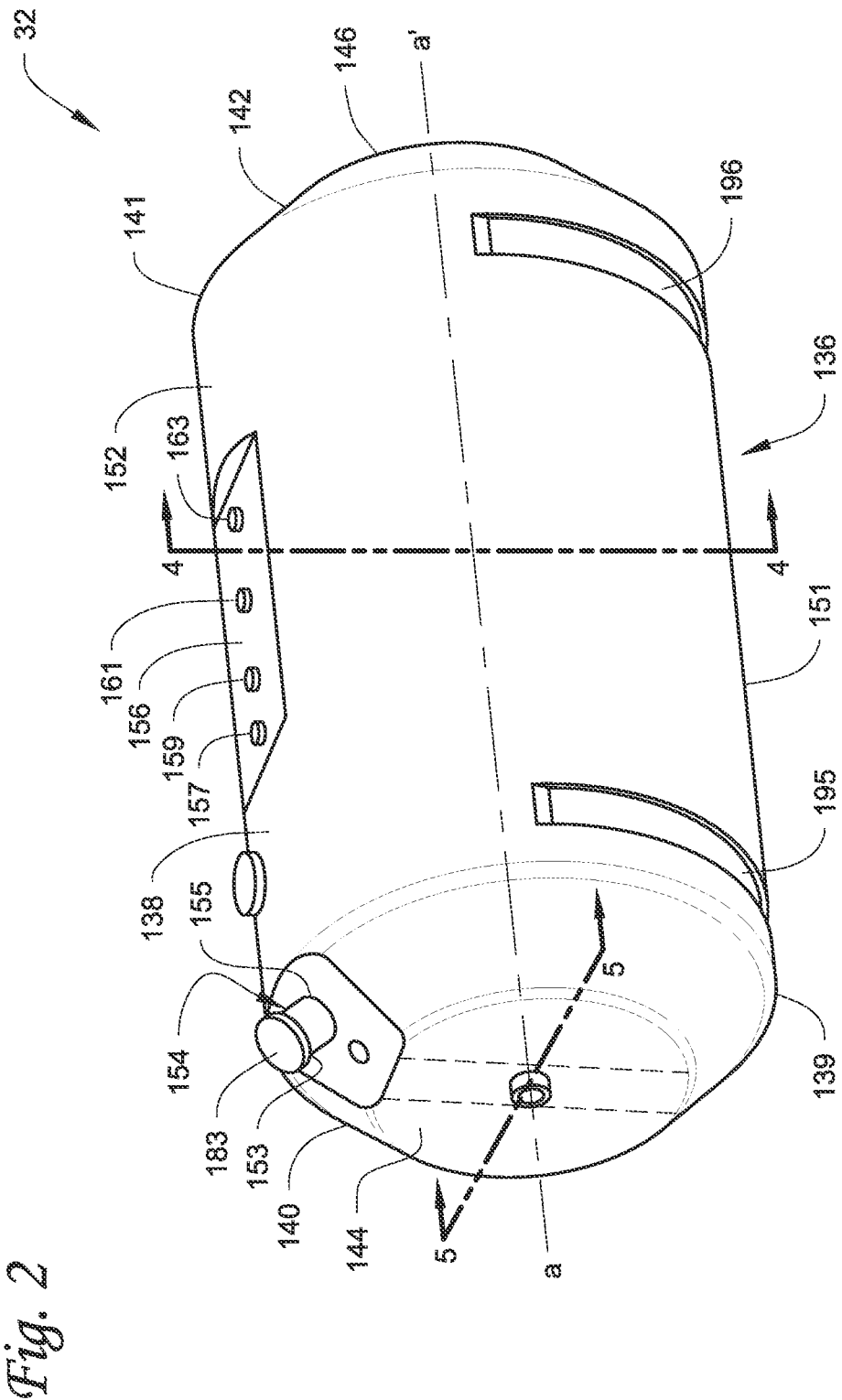
FIG. 2 is a perspective side view of a second embodiment of the fuel tank.

Still referring to FIG. 2, a flat region 156 is formed on the top portion 152 of the sidewall 148. Fuel tank fittings 157, 159, 161, 163 are formed in the flat region 156 for various purposes, such as venting air outside of the fuel tank 32, as a fuel outlet fitting, as a fuel discharge tube fitting, as a fuel pickup tube fitting, etc. It is to be understood that the number and locations of the fuel tank fittings can vary as desired.

The fuel tank 32 also includes a fill neck 154 extending into and communicating with the interior space 149 of the fuel tank 32 to permit the introduction of fuel into the fuel tank 32. The fill neck 154 has a free end 153 and an attachment end 155. The position of the fill neck 154, for example, the position of the attachment end 155 of the fill neck 154 defines the maximum fluid level in the fuel tank 32 to avoid fuel overflow. An imaginary line drawn from the attachment end 155 of the fill neck 154 parallel to the longitudinal axis a-a' of the fuel tank 32 defines the top portion 152 of sidewall 148. In some embodiments, the fill neck 154 is made of plastic material so that the fill neck 154 can be molded in with the fuel tank 32 or adhered to the fuel tank body. In some embodiments, the plastic fill neck 154 has a plastic cap 183 that enables the fuel tank 32 to also be properly vented.

Figure 3:
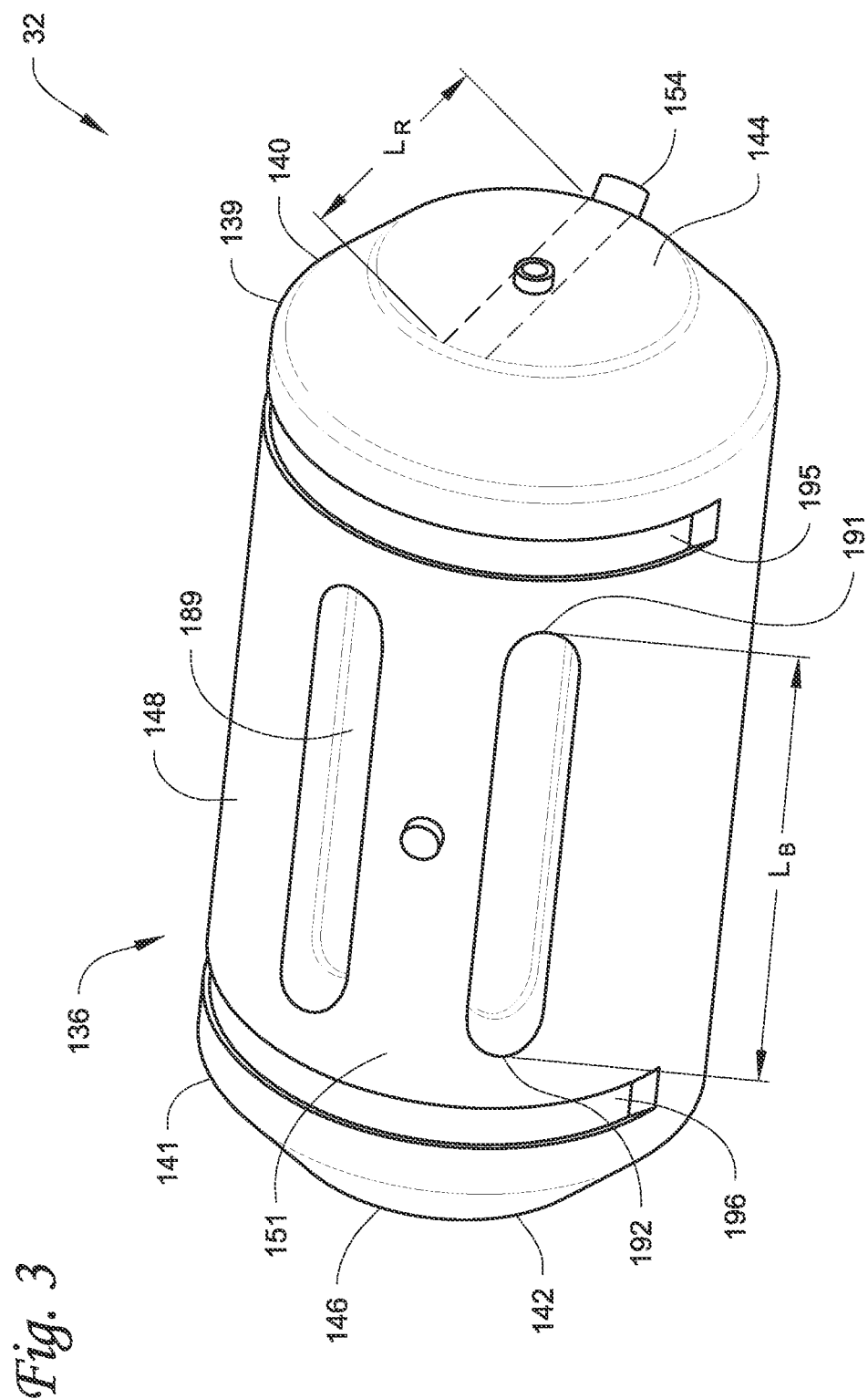
FIG. 3 is a perspective bottom view of the fuel tank of FIG. 3.

Referring to FIGS. 2 and 3, the fuel tank 32 is formed with a plurality of strap recesses 195, 196 formed on the sidewall 148 of the fuel tank 32, such as the first strap recess 195 and the second strap recess 196 as depicted in the figures. Each strap recess 195, 196 extends around a lower circumference of the fuel tank 32 to allow engagement of the strap recess 195, 196 with a strap of a mounting assembly (not shown) for mounting the fuel tank 32 on, e.g., the container chassis 18. It is to be understood that the specific configuration of the strap recesses 195, 196 and the number of the strap recesses 195, 196 can vary depending on the configuration and the number of the straps in the mounting assembly.

Figure 4:
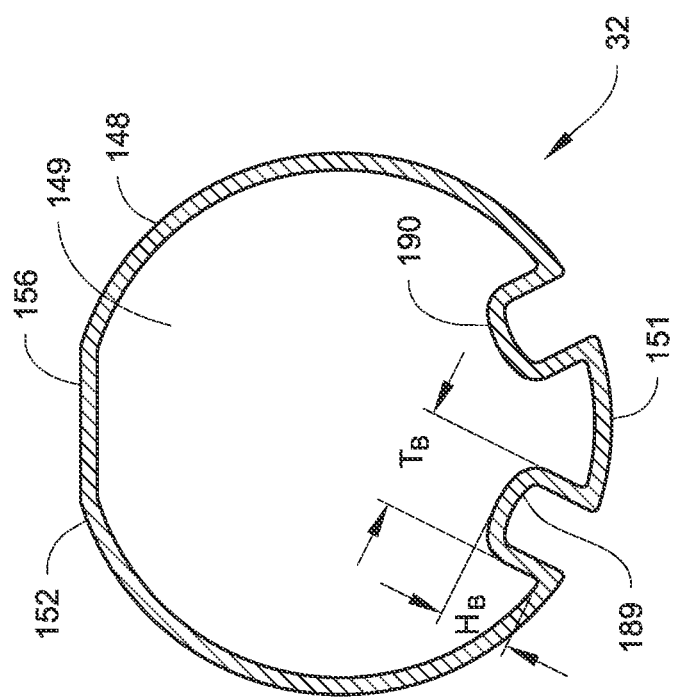
FIG. 4 is a cross sectional view of the fuel tank of FIG. 2 taken along line IV-IV.

Referring now to FIGS. 3 and 4, optionally, the fuel tank 32 may include at least one baffle 190 formed on an inner surface of the sidewall 148 and on a bottom portion 151 of the sidewall 148 which is positioned opposite to the top portion 152 of the sidewall 148. The baffle 190 can help reduce the momentum of a load generated by movement of the liquid contained within the fuel tank 32, thereby reducing sloshing of the liquid adjacent a bottom portion 151 of the sidewall 148. As a result, the destabilizing effects of the sloshing liquid can be reduced effectively.

In the embodiment illustrated in FIGS. 2-4, a plurality of baffles 190 are formed on an inner surface of the sidewall 148 at a location corresponding to a baffle recess 189 formed on an outer surface of the sidewall 148. Each baffle 190 can be formed integrally with the tank body 136, thereby helping eliminate the need to mechanically fasten a baffle inside the fuel tank 32. In the embodiment as shown in FIGS. 3 and 4, a total of two baffles are formed on the bottom portion 151 of the sidewall 148.

In the embodiment shown in FIGS. 2-5, the baffle 190 has an elongate configuration including a first end 191 and a second end 192. The length of the baffle 190 can vary. In the embodiment depicted in FIGS. 3 and 4, the first end 191 is located in a vicinity of the first strap recess 195, and the second end 192 is located in the vicinity of the second strap recess 196. The term "in the vicinity" when used in this paragraph means "near," "close to" or the like, for example a distance of about 0-8 inches. In some embodiments, the distance can be about 4 inches. It is to be understood that the distance indicated by the "in the vicinity" can vary depending on the size of the fuel tank.

It is to be understood that the number of the baffles 190, the arrangement of the baffles 190 and the locations of the baffles 190 can vary as desired. Also, the specific configuration of each baffle, such as the shape, the length $L_B$, the thickness $T_B$, the height $H_B$ and the other dimensions of each baffle 190 can also vary as desired. In one embodiment, the length $L_B$ of the baffle 190 can be about 18 inches, the thickness $T_B$ of the baffle 190 can be about 4.2 inches, and the height $H_B$ of the baffle 190 can be about 2.75 inches. It is to be understood that the size of the baffle can vary. In some embodiments, the length $L_B$ of the baffle 190 can range between ~10 inches-~30 inches, the thickness $T_B$ of the baffle 190 can range between ~1 inch-~10 inches, and the height $H_B$ of the baffle 190 can range between ~0.5 inches-~10 inches.

Figure 5:
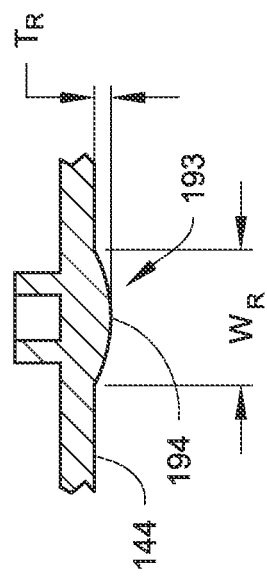
FIG. 5 is a cross sectional view of an end wall of the fuel tank of FIG. 2 taken along line V-V.

Referring now to FIGS. 2-3 and 5, optionally, each of the end walls 144, 146 may be formed with a reinforcing region 193 to enhance the strength, e.g., impact strength, and the stiffness of the fuel tank 32. In the depicted embodiment, the reinforcing region 193 extends through a center of each end wall 144, 146 from a top to a bottom of the end wall 144, 146.

In the depicted embodiment, the reinforcing region 193 can be a continuous linear region, having a greater thickness at a longitudinally extending middle portion 194. However, it is to be understood that the specific configuration of each reinforcing region 193, such as the location, the shape, the length $L_R$, the width $W_R$, the thickness $T_R$ and the other dimensions of each reinforcing region 193 can vary as desired. In one embodiment, the length $L_R$ of the reinforcing region 193 is the diameter of the end wall 144 or 146, the width $W_R$ of the reinforcing region 193 can range between ~0.5 inches-~10 inches, and the thickness $T_R$ of the reinforcing region 193 can range between ~0.1 inches to ~4 inches.

The fuel tank 32 may be produced by blow molding, rotational molding, thermoformed (which will be described in more detail below) or other processes as desired. The term "blow molding" when used herein refers to a process of forming hollow articles by expanding a heated plastic element against the internal surfaces of a mold. Typically, a tube or parison is extruded between the open halves of a metal mold, and the mold is then closed to encompass a portion of the parison, and then air is injected through the walls of the parison. In some embodiments, the reinforcing region 193 is a pinch seal formed during a molding process.

Figure 6:
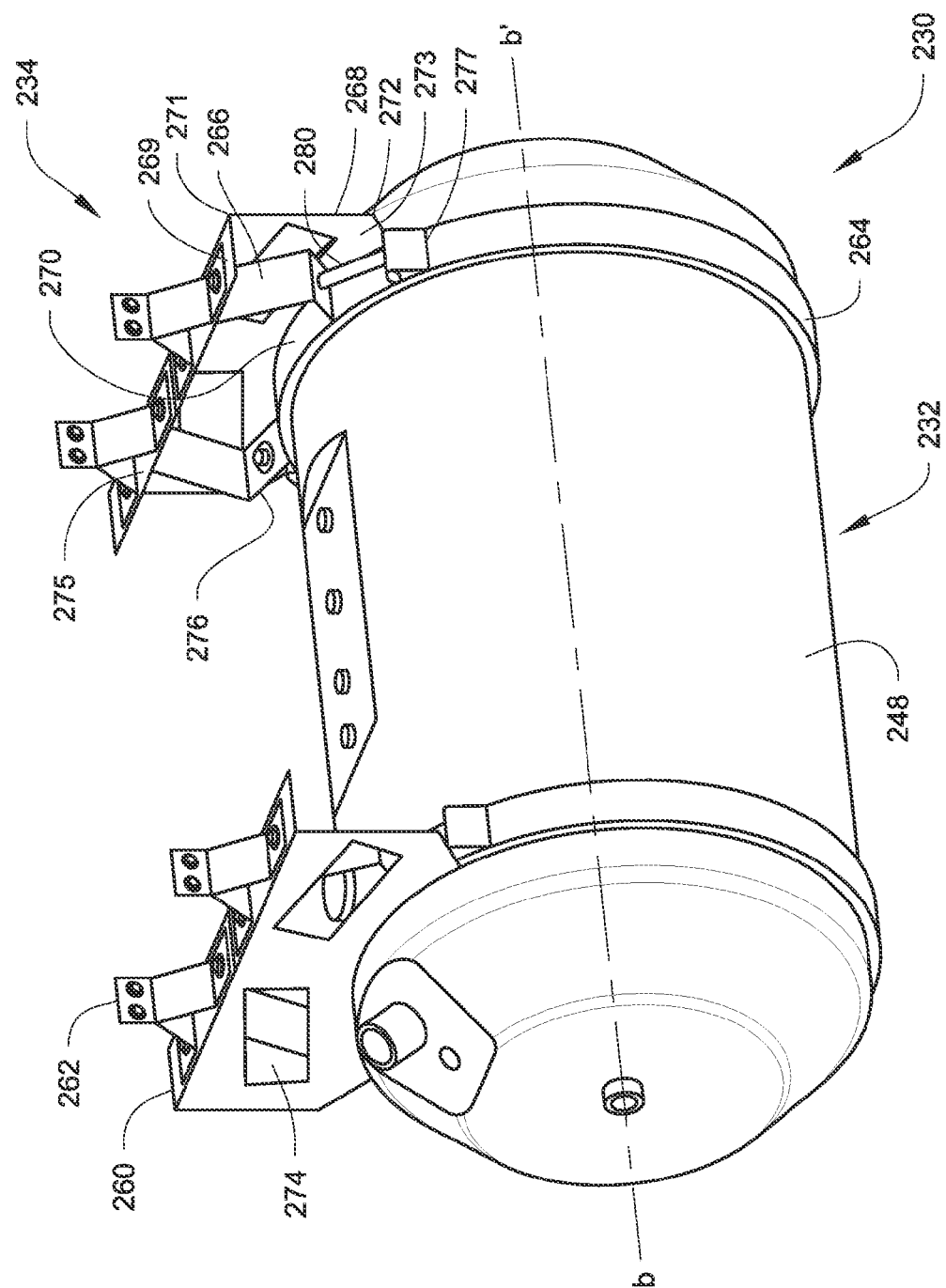
FIG. 6 is a perspective side view of a fuel tank assembly which includes a third embodiment of the fuel tank.
Figure 7:
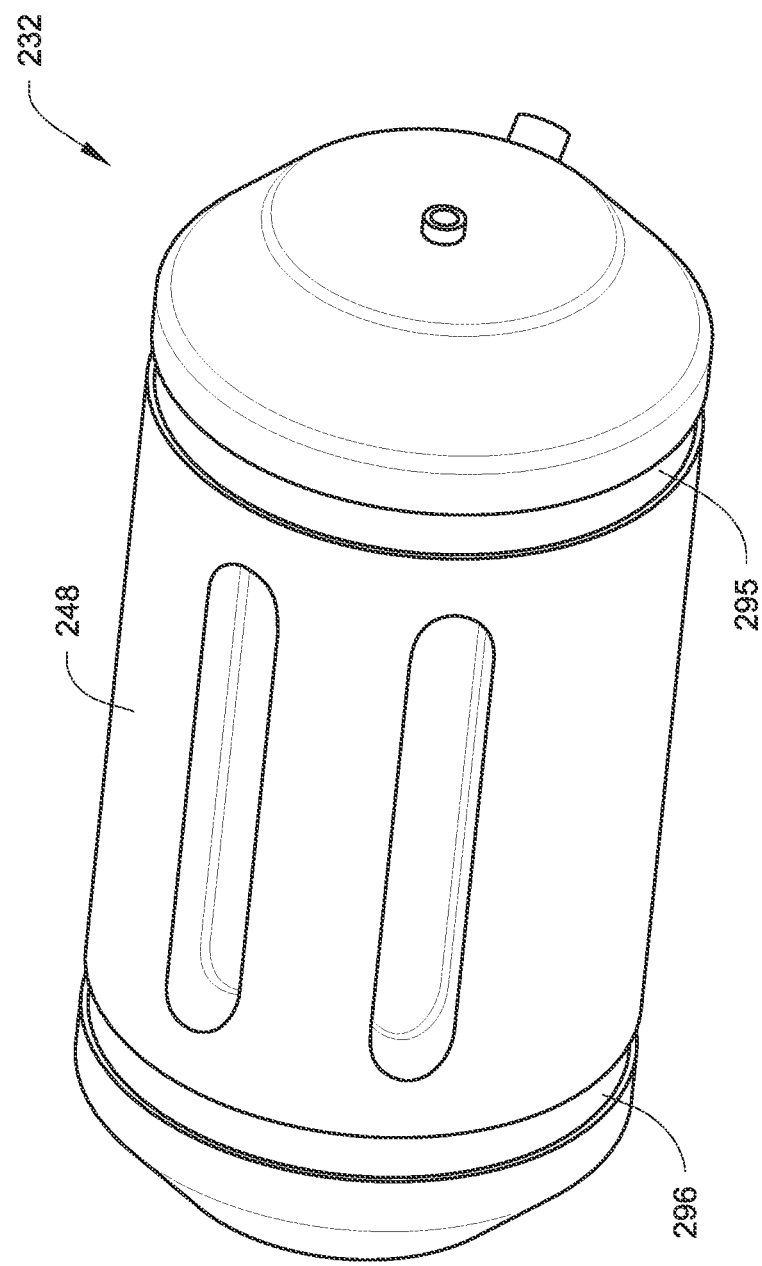
FIG. 7 is a perspective bottom view of the fuel tank in FIG. 6.

FIGS. 6 and 7 illustrate another embodiment of a fuel tank assembly 230 having a fuel tank 232 and a mounting assembly 234. As shown in FIGS. 6 and 7, the fuel tank 232 has a similar configuration to the embodiment of FIGS. 2-5 except that strap recesses 295, 296 formed on a sidewall 248 of the fuel tank 232 extend around an entire circumference of the fuel tank 232, rather than only on a lower circumference the fuel tank 232 as shown in FIGS. 2 and 3.

As shown in FIG. 6, the mounting assembly 234 includes a bracket 260, an attachment member 262 configured to attach the bracket 260 to a container chassis, a mounting strap 264, and a hanger 266 which is used to hang the fuel tank 232 via the strap 264. However, it is to be understood that other configurations of the mounting assembly can be used to mount the fuel tank 232 to a container chassis.

The bracket 260 is configured to provide rigidity to the mounting assembly 234. As shown in FIG. 6, the bracket 260 has a panel member 268, a first flange 269 perpendicular to the panel member 268 extending from a first end 271 of the panel member 268, and a second flange 270 extending from a second end 272 of the panel member 268 opposite the first end 271 on the same side of the panel member 268 as the first flange 270. As a result, a channel 273 is formed between the first and second flanges 269, 270. The first flange 269 is configured to be fastened with the attachment member 262 for attachment of the mounting assembly 234 with the container chassis. The second flange 270 is curved to snugly fit or contact the curved sidewall 248 of the fuel tank 232.

In the embodiment as shown in FIG. 6, when the panel member 268 is mounted on the fuel tank 232, it is positioned in a plane perpendicular to a longitudinal axis b-b' of the fuel tank 232. Openings 274 can be formed in the panel member 268 to enable the panel member 268 to be lighter in weight and to use less material. This can help reduce the load of the TRS and help reduce the material cost for the bracket 260.

The hanger 266 has a bracket mounting portion 275 attached to a surface of the first flange 269 of the bracket 260 that faces the channel 273, and a free end 276 which attaches the strap 264 to the hanger 266.

The strap 264 has two ends 277 suitably attached to free ends 276 of the hanger 266, respectively, by suitable fasteners 280. This allows the second flange 270 of the bracket 260 and the strap 264 to snugly encompass the sidewall 248 of the fuel tank 232. As shown in FIG. 6, the second flange 270 of the bracket 260 and the strap 264 are configured to be circumferentially oriented about the sidewall 248 of the fuel tank 232.

Various fasteners 280 can be used to fasten the ends 277 to the free ends 276 of the hanger 266. An example of the fasteners 280 can be the bolt and nut connections as shown in FIG. 6. The fasteners 280 are configured to adjust the distance between the ends 277 of the strap 264 with the free ends 276 of the second flange 270 of the hanger 266. When assembling the mounting assembly 234 with the fuel tank 232, the strap 264 is positioned in the strap recesses 295, 296 formed on the sidewall 248 of the fuel tank 232 to maintain the fuel tank 232 in its fixed position and its preformed shape.

Figure 8:
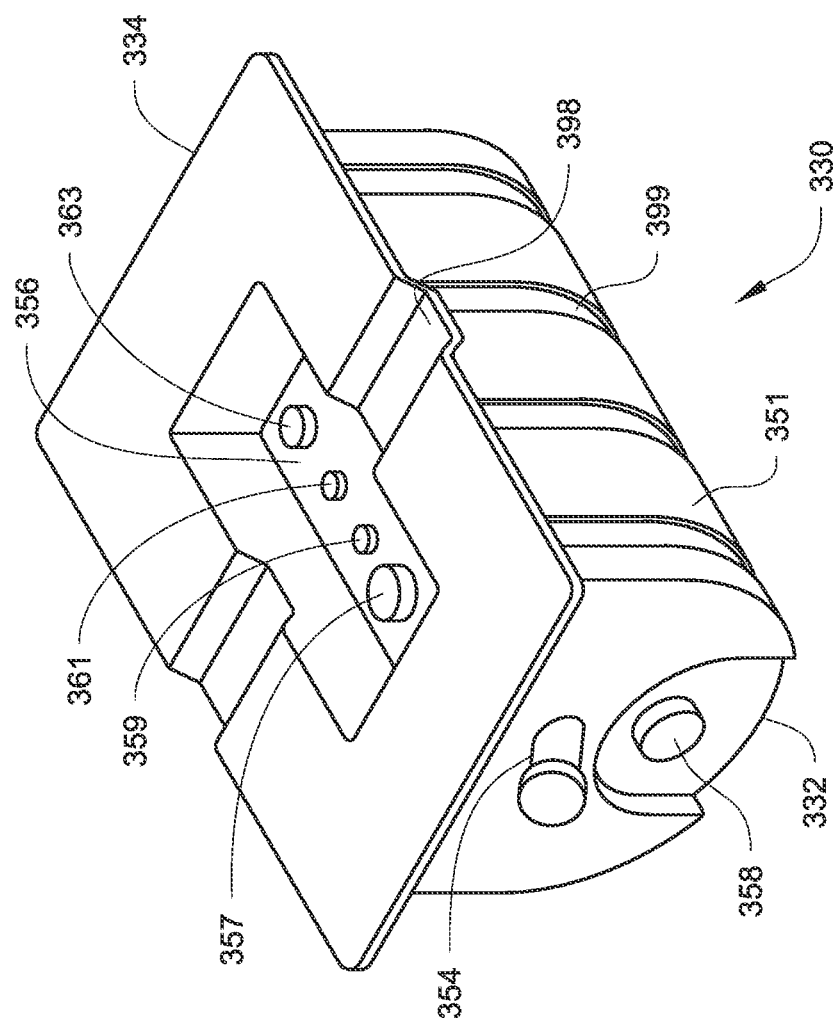
FIG. 8 is a perspective view of a further fuel tank assembly which includes a fourth embodiment of the fuel tank.

FIG. 8 illustrates a perspective view of an integrally thermoformed fuel tank assembly 330 which includes a fuel tank 332 and a mounting assembly 334 integrally molded with the fuel tank 332. The fuel tank assembly 330 includes a fill gauge 358 and a fill neck 354. The fill neck 354 extends into and communicating with an interior space of the fuel tank 332 to permit the introduction of fuel into the fuel tank 332. The fuel tank further includes a flat region 356 formed on top of the fuel tank 332. Fuel tank fittings 357, 359, 361, 363 are formed in the flat region 356 for various purposes, such as venting air outside of the fuel tank 332, as a fuel outlet fitting, as a fuel discharge tube fitting, as a fuel pickup tube fitting, etc. It is to be understood that the number and locations of the fuel tank fittings can vary as desired.

The fuel tank 332 further includes at least one channel 398 to allow access to the fuel tank fittings 357, 359, 361, 363. At least one rib 399 extending into the interior space is formed on a bottom portion 351 of the fuel tank 332 for enhancement of strength of the fuel tank 332.

In some embodiments, the fuel tank 32, 232 can pass a 30-foot drop test under US Department of Transportation standard. A drop test is conducted by filling the fuel tank with a quantity of water having a weight equal to the weight of the maximum fuel load of the tank and drop the tank 30-foot onto an unyielding surface so that it lands squarely on one corner. The fuel tank passes the drop test if neither the tank nor any fitting leaks more than a total of 1 ounce by weight of water per minute. In some embodiments, the fuel tank which passes the 30-foot drop test is a 50-gallon fuel tank.

In some embodiments, the fuel tank 32, 232 can pass a flame test under Economic Commission for Europe standard R34, Issue 2 (November 2003), Annex 4, Testing of Fuel Tanks Made of Plastic Material. Specifically, a ~50-gallon 350 fuel tank is filled with water to 80% capacity, which corresponded to a volume of ~42 gallons of water. In the test, the fuel tank is positioned such that it is centered over a fuel pan at a height of ~15 inches above the fuel level. The fuel pan has a dimension of about 1090×940 mm and is filled with gasoline and is ignited. The fuel pan is allowed to free burn for a 1-minute period prior to moving the fuel pan into place underneath the fuel tank. Once the fuel pan is in place, the fire is allowed to burn for a period of 2 minutes, and at the end of the burn period, the fuel pan is pulled out from underneath the fuel tank. In the test, the residual flaming on the fuel tank surface is allowed to burn for approximately 45 seconds following the test for observation.

During testing of a fuel tank such as the fuel tank 32, 232, no leakage of fuel was observed immediately following the test. Shortly after the extinguishment period, leakage developed at the aluminum fill cap location. No visible openings or leakage from underside of the fuel tank was observed. The top portion of the fuel tank was slightly collapsed. Residual flaming on the fuel tank surface following the test continued throughout post-test observation period, but flames reduced in size.

Aspects:

It is noted that any of aspects 1-6 below can be combined with any of aspects 7-10 and aspects 11-16. Also, any of aspects 7-10 below can be combined with any of aspects 11-16.

Aspect 1. A fuel tank, comprising:
  an elongate tank body, including:
    a first end wall;
    a second end wall; and
    a sidewall extending between the first and second end walls;
  an interior space defined by the sidewall and the first and second end walls; and
  a fuel tank vent configured to vent air outside the fuel tank,
  wherein the entire tank body is made of a plastic.

Aspect 2. The fuel tank of aspect 1, further comprising:
  a baffle recess formed on an outer surface of the sidewall; and
  a baffle formed on an inner surface of the side wall, the baffle protruding into the interior space corresponding to a location of the baffle recess.

Aspect 3. The fuel tank of any of aspects 1-2, further comprising a continuous linear reinforcing region formed on each of the first and second end walls and through a center of the respective first and second end walls.

Aspect 4. The fuel tank of aspect 3, wherein the reinforcing region is a pinch seal formed during a molding process.

Aspect 5. The fuel tank of any of aspects 1-4, wherein the fuel tank passes a 30-feet drop test under a US Department of Transportation standard.

Aspect 6. The fuel tank of any of aspects 1-5, wherein the fuel tank passes a flame test under an Economic Commission for Europe standard.

Aspect 7. A fuel tank assembly, comprising:
  a fuel tank, comprising:
    an elongate tank body, comprising:
      a first end wall;
      a second end wall; and
      a sidewall extending between the first and second end walls;
    an interior space defined by the sidewall and the first and second end walls; and
    a fuel tank vent configured to vent air outside of the fuel tank,
    wherein the entire tank body is made of a plastic; and
  a mounting assembly configured to mount the fuel tank to a chassis.

Aspect 8. The fuel tank assembly of aspect 7, wherein the fuel tank further comprises:
  a baffle recess formed on an outer surface of the sidewall; and
  a baffle formed on an inner surface of the side wall, the baffle protruding into the interior space corresponding to a location of the baffle recess.

Aspect 9. The fuel tank assembly of any of aspects 7-8, wherein the fuel tank further comprises a continuous linear reinforcing region formed on each of the first and second end walls and through a center of the respective first and second end walls.

Aspect 10. The fuel tank assembly of aspect 9, wherein the reinforcing region is a pinch seal formed during a molding process.

Aspect 11. A method of making a fuel tank, comprising:
fabricating a fuel tank by a molding process, comprising molding an elongate tank body, including:
molding a first end wall;
molding a second end wall;
molding a sidewall extending between the first and second end walls;
molding a fuel tank vent configured to vent with atmosphere,
wherein an interior space is defined by the sidewall and the first and second end walls, and
wherein the entire tank body is made of a plastic.

Aspect 12. The method of aspect 11, wherein molding an elongate tank body includes blow molding the tank body.

Aspect 13. The method of any of aspects 11-12, wherein molding an elongate tank body includes rotational molding the tank body.

Aspect 14. The method of any of aspects 11-13, wherein molding an elongate tank body further includes:
forming a baffle protruding into the interior space on an inner surface of the side wall.

Aspect 15. The method of any of aspects 11-14, wherein molding an elongate tank body further includes molding a continuous linear reinforcing region formed on each of the first and second end walls and through a center of the respective first and second end walls.

Aspect 16. The fuel tank of aspect 15, wherein the reinforcing region is a pinch seal formed in the molding process.

A number of embodiments of the invention have been described. Nevertheless, it will be understood that various modifications may be made without departing from the spirit and scope of the invention.

The invention claimed is:

1. A fuel tank, comprising:
an elongate tank body, including:
a longitudinal axis;
a first end wall;
a second end wall;
a sidewall extending between the first and second end walls; and
an interior space defined by the sidewall and the first and second end walls;
first and second baffles protruding into the interior space and extending along the longitudinal axis of the tank body;
first and second baffle recesses formed on an outer surface of the tank body at locations corresponding to the first and second baffles, respectively; and
a fuel tank vent configured to vent air outside the fuel tank,
wherein the entire tank body is made of a plastic,
wherein the first baffle recess defines a first opening on the outer surface of the tank, and the second baffle recess defines a second opening on the outer surface of the tank; each of the first and second openings has a first end located in a vicinity of a first strap recess and a second end located in a vicinity of a second strap recess; the first and second openings being oriented generally parallel with each other.

2. The fuel tank of claim 1, further comprising a continuous linear reinforcing region formed on each of the first and second end walls and through a center of the respective first and second end walls.

3. The fuel tank of claim 2, wherein the reinforcing region is a pinch seal formed during a molding process.

4. The fuel tank of claim 1, wherein the fuel tank passes a 30-feet drop test under a US Department of Transportation standard.

5. The fuel tank of claim 1, wherein the fuel tank passes a flame test under an Economic Commission for Europe standard.

6. The fuel tank of claim 1, wherein the entire tank body and the baffles are made of high density polyethylene (HDPE) and form a continuous one piece housing.

7. The fuel tank of claim 1, wherein the entire tank body is made of high density polyethylene (HDPE) and form a continuous one piece housing.

8. The fuel tank of claim 1, wherein each of the two baffles has a first end wall, a second end wall and two sidewalls extending between the first and second end walls; the two baffles are oriented such that in a cross section perpendicular to the longitudinal axis of the tank body, the sidewalls of the first baffle and the sidewalls of the second baffle are not parallel to each other.

9. A fuel tank assembly, comprising:
a fuel tank, comprising:
an elongate tank body, comprising:
a longitudinal axis;
a first end wall;
a second end wall;
a sidewall extending between the first and second end walls; and
an interior space defined by the sidewall and the first and second end walls;
first and second baffles protruding into the interior space and extending along the longitudinal axis of the tank body;
first and second baffle recesses formed on an outer surface of the tank body at locations corresponding to the first and second baffles, respectively; and
a fuel tank vent configured to vent air outside of the fuel tank; and
a mounting assembly configured to mount the fuel tank to a chassis,
wherein the entire tank body is made of a plastic, and
wherein the first baffle recess defines a first opening on the outer surface of the tank, and the second baffle recess defines a second opening on the outer surface of the tank; each of the first and second openings has a first end located in a vicinity of a first strap recess and a second end located in a vicinity of a second strap recess; the first and second openings being oriented generally parallel with each other.

10. The fuel tank assembly of claim 7, wherein the fuel tank further comprises a continuous linear reinforcing region formed on each of the first and second end walls and through a center of the respective first and second end walls.

11. The fuel tank assembly of claim 10, wherein the reinforcing region is a pinch seal formed during a molding process.

12. The fuel tank assembly of claim 7, wherein the entire tank body is made of high density polyethylene (HDPE) and form a continuous one piece housing.

13. A method of making a fuel tank, comprising:
fabricating a fuel tank by a molding process, comprising molding an elongate tank body, including:
molding a first end wall;
molding a second end wall;
molding a sidewall extending between the first and second end walls;
forming first and second baffles protruding into an interior space enclosed by the sidewall and the first and second end walls of tank body and extending along a longitudinal axis of the tank body, such that two baffle recesses are formed on an outer surface of tank body at locations corresponding to the first and second baffles, respectively, each of the; and molding a fuel tank vent configured to vent with atmosphere, wherein the first baffle recess defines a first opening on the outer surface of the tank, and the second baffle recess defines a second opening on the outer surface of the tank; each of the first and second openings has a first end located in a vicinity of a first strap recess and a second end located in a vicinity of a second strap recess; the first and second openings being oriented generally parallel with each other, and wherein the entire tank body is made of a plastic.

14. The method of claim 13, wherein molding an elongate tank body includes blow molding the tank body.

15. The method of claim 13, wherein molding an elongate tank body includes rotational molding the tank body.

16. The method of claim 13, wherein molding an elongate tank body further includes molding a continuous linear reinforcing region formed on each of the first and second end walls and through a center of the respective first and second end walls.

17. The method of claim 16, wherein the reinforcing region is a pinch seal formed in the molding process.

* * * * *